United States Patent
Yang et al.

(10) Patent No.: US 12,493,976 B2
(45) Date of Patent: Dec. 9, 2025

(54) METHOD FOR TRAINING DEPTH ESTIMATION MODEL, TRAINING APPARATUS, AND ELECTRONIC DEVICE APPLYING THE METHOD

(71) Applicant: HON HAI PRECISION INDUSTRY CO., LTD., New Taipei (TW)

(72) Inventors: Jung-Hao Yang, New Taipei (TW); Chin-Pin Kuo, New Taipei (TW); Chih-Te Lu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 322 days.

(21) Appl. No.: 18/143,534

(22) Filed: May 4, 2023

(65) Prior Publication Data

US 2023/0401737 A1    Dec. 14, 2023

(30) Foreign Application Priority Data

Jun. 8, 2022   (CN) .......................... 202210642912.3

(51) Int. Cl.
*G06K 9/00*     (2022.01)
*G06T 7/55*     (2017.01)
*G06T 7/70*     (2017.01)

(52) U.S. Cl.
CPC .................. *G06T 7/70* (2017.01); *G06T 7/55* (2017.01); *G06T 2207/10028* (2013.01); *G06T 2207/20081* (2013.01); *G06T 2207/20084* (2013.01)

(58) Field of Classification Search
CPC . G06T 2207/10016; G06T 2207/10028; G06T 2207/20081; G06T 2207/20084; G06T 7/50; G06T 7/55; G06T 7/70
See application file for complete search history.

(56) References Cited

U.S. PATENT DOCUMENTS

| | | | |
|---|---|---|---|
| 11,321,859 B2* | 5/2022 | Guizilini | .................... G06T 7/74 |
| 11,604,967 B2* | 3/2023 | Smolyanskiy | ......... G06N 3/063 |
| 11,651,581 B2* | 5/2023 | Devitt | ................ G06V 10/7715 |
| | | | 382/190 |
| 2021/0398302 A1* | 12/2021 | Guizilini | ................... G06T 7/50 |

* cited by examiner

*Primary Examiner* — Hadi Akhavannik
(74) *Attorney, Agent, or Firm* — ScienBiziP, P.C.

(57) ABSTRACT

A method acquires a first image and a second image of a target object being inputted into the depth estimation network for outputting a depth image. A pixel posture conversion relationship between the first image and the second image is obtained. The pixel posture conversion relationship includes a position relationship between each first pixel in the first image and a second pixel in the second image, which correspond to a same part of the target object. A restored image is generated based on the depth image, the pixel posture conversion relationship, and pre-obtained camera parameters. A loss of the depth estimation network is determined based on a difference between the first image, the depth image, the restored image, and the second image for adjusting the parameters of the depth estimation network. A training apparatus, and an electronic device applying the method are also disclosed.

14 Claims, 4 Drawing Sheets

METHOD FOR TRAINING DEPTH ESTIMATION MODEL, TRAINING APPARATUS, AND ELECTRONIC DEVICE APPLYING THE METHOD

FIELD

The subject matter herein generally relates to computer visual technology.

BACKGROUND

In computer visual technology field, posture estimation is a major project. A PoseNet algorithm model uses a convolutional neural network for estimating posture in 6 degrees of freedom used in a camera. When a static object is inputted to the PoseNet algorithm model, the posture transformational matrix as the output result of the PoseNet algorithm model is correct. When a moving object is inputted into the PoseNet algorithm model, there is an error in the posture transformational matrix.

There is room for improvement in the art.

BRIEF DESCRIPTION OF THE DRAWINGS

Implementations of the present disclosure will now be described, by way of example only, with reference to the attached figures.

DETAILED DESCRIPTION

The present disclosure is described with reference to accompanying drawings and the embodiments. It will be understood that the specific embodiments described herein are merely part of all embodiments, not all the embodiments. Based on the embodiments of the present disclosure, it is understandable to a person skilled in the art, any other embodiments obtained by persons skilled in the art without creative effort shall all fall into the scope of the present disclosure. It will be understood that the specific embodiments described herein are merely some embodiments and not all.

It will be understood that, even though the flowchart shows a specific order, an order different from the specific order shown in the flowchart can be implemented. The method of the present disclosure can include one or more steps or actions for achieving the method. The steps or the actions in the method can be interchanged with one another without departing from the scope of the claims herein.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

Before embodiments of the present disclosure are described in detail, application scenarios in embodiments of this application are described firstly.

A transformational matrix (RT) outputted by a current PostNet algorithm model is a posture transformation from a time point t to a time point t+1, which is a camera RT. When there is a moving object in an image, the camera RT is not equal to the RT of the moving object, thus a posture transformation of the moving object cannot be acquired. Therefore, a method for training a depth estimation network, a training apparatus for a depth estimation network, an electronic device, and a computer readable storage medium of the present disclosure are provided by acquiring posture RT of each pixel. Each pixel learns and adjusts the corresponding posture transformation according to the corresponding posture RT, the problem on inconsistency of the RT and the camera RT of the moving object can be fixed, and an accuracy rate of posture transformation of the moving object the is improved.

The method for training the depth estimation network, the training apparatus for the depth estimation network, the electronic device, and the computer readable storage medium of the present disclosure may be applied in fields of autonomous vehicle driving, scenario understanding, robotics, 3-dimension reconstruction, photography, intelligence medical, intelligence human-computer, spatial mapping, augmented reality.

Figure 1:
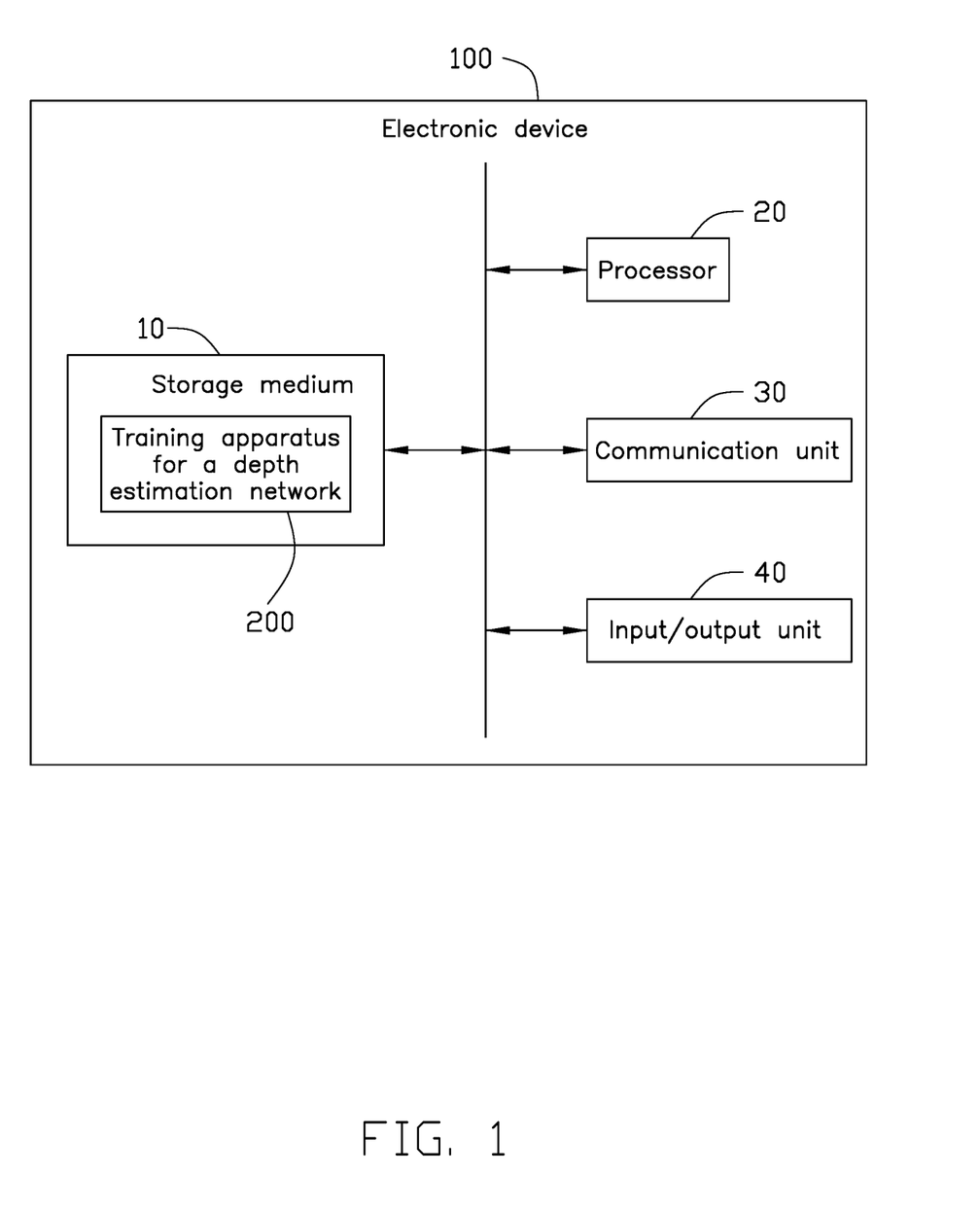
FIG. 1 is diagram illustrating an embodiment of an electronic device according to the present disclosure.
Figure 2:
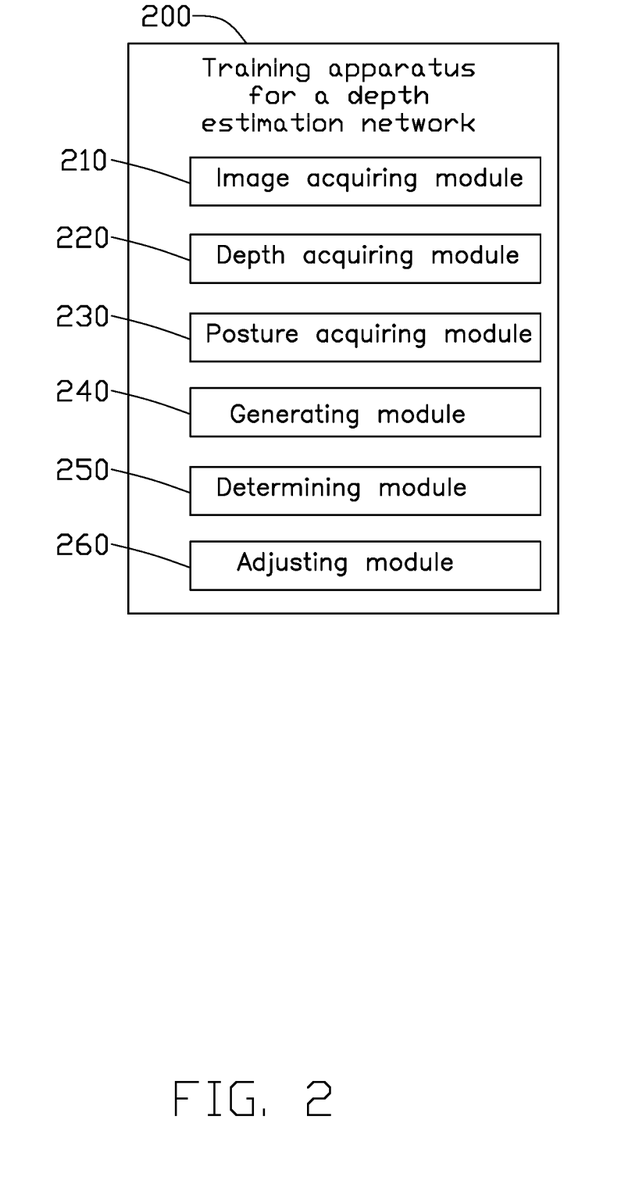
FIG. 2 is a diagram illustrating an embodiment of a training apparatus for a depth estimation network according to the present disclosure.

FIG. 1 shows the electronic device 100 of the present disclosure. The electronic device 100 includes a storage medium 10, a processor 20, and the training apparatus 200 of the depth estimation network stored in the storage medium 10, which may be executed by the processor 20. The processor 20 implements the steps of the method for training the depth estimation network, for example the steps shown in FIGS. 3 and 4, by executing the training apparatus 200 of the depth estimation network, or implements the functions of the modules in the training apparatus 200 of the depth estimation network, for example the modules 210-260 as shown in FIG. 2, by executing the training apparatus 200 of the depth estimation network.

The training apparatus 200 of the depth estimation network may be divided into one or a plurality of modules, the one or plurality of modules are stored in the storage medium 10 and are executed by the processor 20 so as to implement the present disclosure. The one or plurality of modules may be a series of computer program instruction segments that may accomplish particular functionalities, these instruction segments are used for describing an executive process of the training apparatus 200 for the depth estimation network in the electronic device 100. For example, the training apparatus 200 for the depth estimation network may be divided into an image acquiring module 210, a depth acquiring module 220, a posture acquiring module 230, a generating module 240, a determining module 250, and an adjusting module 260. The functions of the above modules are described as below.

The processor 20 may be a central processing unit (CPU), and may also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor may be a microprocessor, alternatively, the processor 20 may also be any conventional processor and so on. The processor 20 is a control center of the electronic device 100, every part of the whole user terminal is connected using various interfaces and circuits.

The storage medium 10 may be used to store the training apparatus 200 for the depth estimation network and/or modules, the processor 20 implements various functions of the electronic device 100 by performing or executing computer programs and/or modules stored in the storage medium 10 and calling data stored in the storage medium 10. The storage medium may include high-speed RAM (Random Access Memory), and may also include non-volatile memory, such as a hard disk, a memory, a plug-in hard disk, a smart memory card (SMC), a secure digital (SD) card, a flash card, at least one magnetic disk storage device, a flash memory device, or other volatile solid-state storage device.

In one embodiment, the electronic device 100 may further include a communication unit 30. The communication unit 30 establishes a communication connection with other computer apparatus in a wired manner or a wireless manner. The communication unit 30 can be a wired communication module or a wireless communication module.

The electronic device 100 may further include an input/output unit 40. The input/output unit 40 may be a keyboard, a mouse, or a display panel. The display panel is used for displaying medium files of the electronic device 100.

The electronic device 100 may be a computer device, such as a desktop computer device, a notebook, a palmtop computer device, a cloud server, and the like. Those skilled in the art will understand that a structure of the electronic device 100 as shown in FIG. 1 is only an example and does not constitute a limitation on the electronic device 100. The structure of the electronic device 100 may further include more or fewer components than those shown in FIG. 1 or combine some components, or have different component arrangements, for example, the electronic device 100 may be further include a network interface device and a bus, and the like.

FIG. 2 shows the structure of the training apparatus 200 for the depth estimation network.

The training apparatus 200 for the depth estimation network includes the image acquiring module 210, the depth acquiring module 220, the posture acquiring module 230, the generating module 240, the determining module 250, and the adjusting module 260. In one embodiment, the modules can be stored in the storage device 10 and can be run on the at least one processor 20. It should be understood that, in other embodiments, the modules can be instructions or firmware resident in the at least one processor 20.

The image acquiring module 210 is configured to acquire a first image and a second image of a target object. The first image and the second image are images at different time points.

The depth acquiring module 220 is configured to input the first image into a depth estimation network and obtain a depth image.

The posture acquiring module 230 is configured to input the first image and the second image into the depth estimation network and obtain a pixel posture conversion relationship between the first image and the second image. The pixel posture conversion relationship may include a position relationship between each first pixel in the first image and a corresponding second pixel in the second image. The first pixel and the second pixel correspond to a same part of a same target object.

The generating module 240 is configured to generate a restored image based on the depth image, the pixel posture conversion relationship, and pre-obtained camera parameters.

The determining module 250 is configured to determine a loss of the depth estimation network based on a difference between the first image, the depth image, the restored image, and the second image.

The adjusting module 260 is configured to adjust the parameters of the depth estimation network based on the loss of the depth estimation network.

Figure 3:
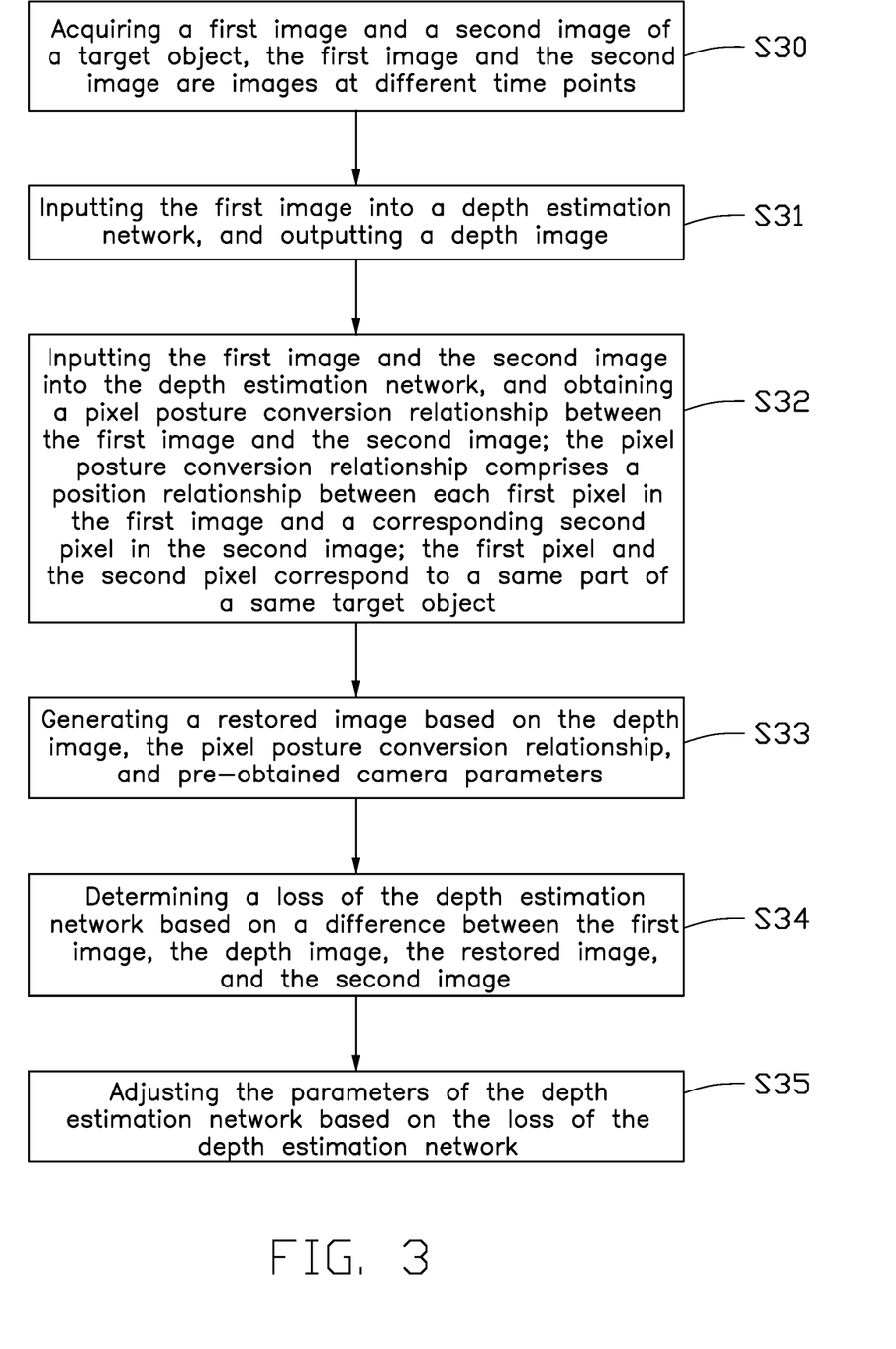
FIG. 3 is a flowchart illustrating a first embodiment of a method for training a depth estimation network according to the present disclosure.

FIG. 3 shows a flowchart of the method for training the depth estimation network. It should be note that, the execution entity of the method for training the depth estimation model may be a training apparatus, which can be a hardware device or a software device in a hardware device, and the like. The hardware device may be a terminal device or a server, and the like. As shown in FIG. 3, the method includes the following steps and these steps may be re-ordered.

In block S30, a first image and a second image of a target object are acquired. The first image and the second image are images at different time points.

In one embodiment, the depth estimation model acquires training image data. The training image data includes the first image and the second image. The first image and the second image are images of the same target object captured at difference time points. For example, the first image can be an image captured at a time point t, and the second image can be an image captured at a time point t+1. The target object may be a person, an animal, a vehicle, or a building, and the like. Both of the first image and the second image may include a moving target object, for example, a moving vehicle or person relative to the ground.

In detail, a monocular camera is used for establishing a training set of a moving vehicle. By setting the monocular camera on a vehicle, and the monocular camera keeps shooting to capture images. The image captured by the monocular camera is used as the training set. In the training set, RGB images $I_t$, $I_{t+1}$ from two adjacent frames at the time point t and the time point t+1 are acquired randomly. The subscript character "t" represents the time point t, and the subscript character "t+1" represents the time point t+1.

In one embodiment, the depth estimation network may include a depth estimation sub-network and a posture estimation sub-network.

The depth estimation sub-network may be an autoencoder (AE) network. The AE is a kind of artificial neural networks (ANNS) used in semi supervised learning and unsupervised learning, and its function is to representation learning the input information by taking the input information as the learning goal. The AE includes an encoder and a decoder. According to learning paradigm, AEs may be divided into an undercomplete AE, a regularized AE, and a variational AE. The undercomplete AE and the regularized AE are discriminative models, and the variational AE is a generation model. According to construction type, the AE may be a neural network of a feedforward structure or a recursive structure.

In some embodiments, the depth estimation network includes a depth encoder and a depth decoder. The depth estimation network feeds the first image through the depth encoder to extract abstract depth features. The depth encoder can extract these features using different machine learning algorithms and techniques.

In some embodiments, the posture estimation network may be a convolutional neural network.

In block S31, the first image is inputted into a depth estimation network and a depth image is obtained.

In one embodiment, in the step S31, the first image is inputted into the depth estimation sub-network, and the depth image is outputted based on parameters of the depth estimation sub-network. In one embodiment, the depth estimation network outputs the depth image by inputting the first image into the depth estimation network. Each pixel value (or gray value) of each pixel in the depth image may represent a relative depth or a depth value. The relative depth may be a sequential logic relationship of each pixel point. A distance between an actual object corresponding to the pixel point and a photographing device or a reference plane severs as the depth value of the pixel point, which is a perpendicular distance between the pixel point of the actual object and the photographing device.

For example, the depth encoder is a convolutional neural network including multiple layers where each subsequent layer reduces dimensionality of features extracted. For example, an input image on the order of 10^6 pixels or data points is reduced to a set of features on the order of 10^5 after the first layer. By the final layer in the depth encoder, the abstract depth features could be on the order of 10^4 or smaller. These numbers are provided purely for illustrative purposes. In practice, the depth encoder may have different numbers of layers and the number of pixels and depth features may vary.

In an inverse fashion, the depth decoder includes multiple layers to increase dimensionality of abstract features.

Following the example above, the depth decoder can take the abstract depth features on the order of 10^4 and gradually—over multiple layers—deduce depth (relative depth or depth value) at each pixel of the input image. The depth decoder then outputs a first depth map wherein each pixel on the depth map corresponds to a distance of the nearest object in the scene that projects to that pixel.

In some embodiments, the depth decoder outputs a disparity map wherein each pixel on the disparity map corresponds to an inverse of the distance. In one embodiment, principles described in reference to depth maps readily apply in implementations with disparity maps. For example, the input image has captured a tree some unknown distance from the camera at a given pixel. The depth decoder outputs a depth value corresponding to a distance from the camera to the block at that pixel.

In some embodiments, the output depth values can be relative to another or intrinsically defined. In other embodiments, the output depth values are up to scale providing real measurements of objects in the scene, e.g., a block is 10 feet away or a building is 25 meters away.

In block S32, the first image and the second image are inputted into a depth estimation network, and a pixel posture conversion relationship between the first image and the second image is obtained. The pixel posture conversion relationship may include a position relationship between each first pixel in the first image and a corresponding second pixel in the second image. The first pixel and the second pixel correspond to a same part of a same target object.

In one embodiment, in the step S32, the first image and the second image are inputted into a posture estimation sub-network, and the pixel posture conversion relationship between the first image and the second image is obtained. The pixel posture conversion relationship outputted by the posture estimation sub-network may include a pixel RT of each pixel in the first image or the second image. The pixel RT is a pixel posture conversion relationship of one pixel in the first image and the second image.

In one embodiment, the posture estimation sub-network receives a plurality of concatenated input images (such as the first image and the second image) to determine a posture for each of the input images. Posture generally refers to a mathematical transformation between perspectives of two images. In some embodiments, the posture more generally describes a perspective of an image wherein the perspectives can be used to define the transformation between two images.

In one embodiment, the posture estimation sub-network may include a posture encoder and a posture decoder. By inputting the first image and the second image into the posture encoder, the posture encoder extracts abstract posture features from the first image and the second image. The abstract posture features are then input through the posture decoder which determines a pixel posture conversion relationship between the first image and the second image. The posture encoder may be configured as a convolutional neural network including multiple layers for extracting the abstract posture features and then deducing the posture for each of the first image and the second image.

For example, due to a point P of the target object, the point P corresponds to a first pixel point P1 in the first image, and the point P corresponds to a second pixel point P2 in the second image. The posture estimation sub-network calculates the pixel posture conversion relationship between the first pixel point P1 and the second pixel point P2. The pixel posture conversion relationships to all pixel points in the first image are calculated and so on.

In block S33, a restored image is generated based on the depth image, the pixel posture conversion relationship, and pre-obtained camera parameters.

In one embodiment, after acquiring the first depth image, the restored image is generated based on the depth value of each pixel point in the first depth image, the pixel posture conversion relationship between the first image and the second image, and the pre-obtained camera parameters.

In detail, the depth value of each pixel point in the first depth image, the camera parameters, the pixel posture conversion relationship, and the position coordinates of each pixel point in the first depth image serve as an input of a position conversion algorithm, for outputting corresponding position coordinates of each pixel point in the restored image. A pixel value of each pixel point in the first depth image is determined, and the restored image is generated based on the pixel values and the position coordinates.

In detail, a formula (1) of the position conversion algorithm is shown as below. The depth value of each pixel point in the first depth image, the camera parameters, the pixel posture conversion relationship, and the position coordinates of each pixel point in the first depth image are inputted into the formula (1) for obtaining corresponding position coordinates of each pixel point in the restored image.

$$B_2 = KTD_1K^{-1}B_1 \qquad \text{Formula (1)}$$

$B_1$ is a position of a pixel point in the first image, by representing with (x1, y1). $B_2$ is a position of a pixel point in the restored image, by representing with (x2, y2). K is a matrix composed by the camera parameters. T is the pixel posture conversion relationship. A number of columns in K is equal to a number of rows in T.

In block S34, a loss of the depth estimation network is determined based on a difference between the first image, the depth image, the restored image, and the second image.

Figure 4:
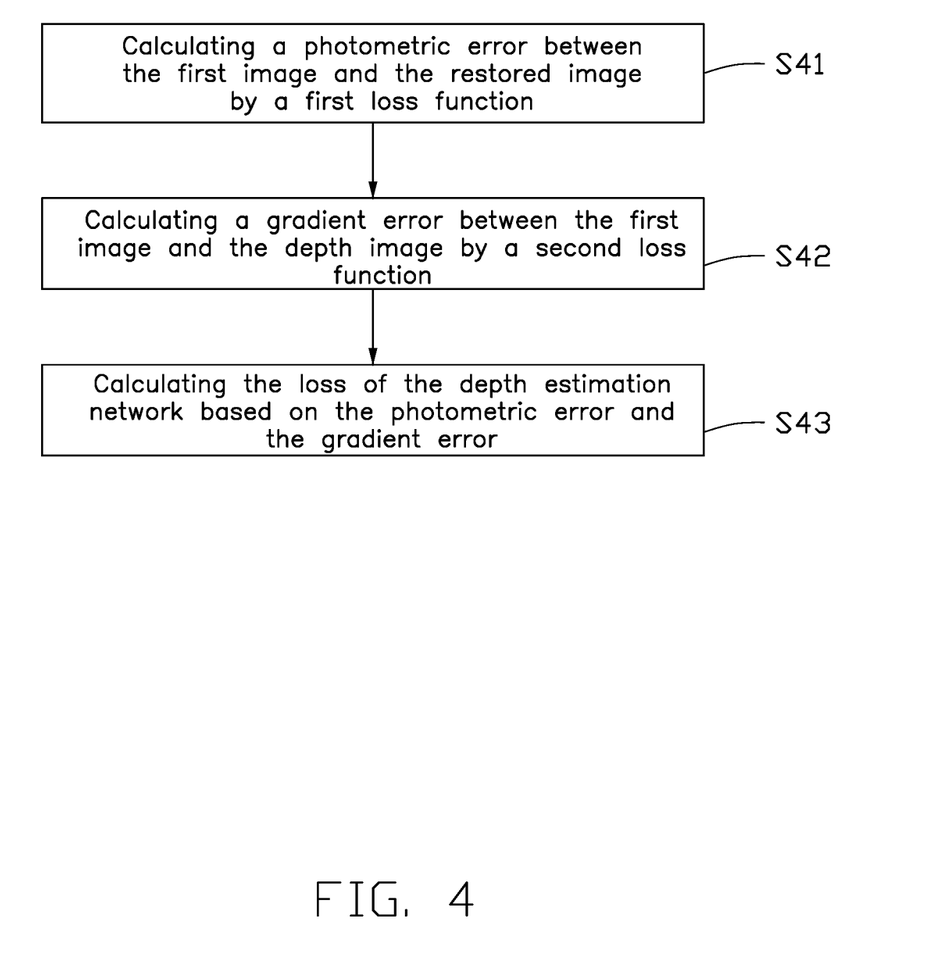
FIG. 4 is a flowchart illustrating a second embodiment of a method for training a depth estimation network according to the present disclosure.

FIG. 4 shows a second embodiment of the method for training a depth estimation network.

In block S41, a photometric error between the first image and the restored image is calculated by a first loss function.

In block S42, a gradient error between the first image and the depth image is calculated by a second loss function.

In block S43, the loss of the depth estimation network is calculated based on the photometric error and the gradient error.

The first loss function is shown as below.

$$L_{somooth} = \Sigma_j |\nabla D_t(j)| e^{-|\nabla I_t(j)|}, \text{ for } j \in Sj$$

$\nabla D_t(j)$ represents a gradient of a region of the target object in the first image $I_t$; $\nabla I_t(j)$ represents a gradient of a region of the target object in the depth image $D_t$; S represents a pixel point set of the target object in the first image $I_t$.

The second loss function is shown as below.

$$L_{ph}(I_t,\Gamma_t) = (1-\alpha)|\Gamma_t(u,v) - I_t(u,v)| + \alpha L_{SSIM}$$

$L_{ph}(I_t, \Gamma_t)$ represents a brightness uniformity error, $I_t$ represents the restored image; $\Gamma_t$ represents the second image; $\alpha$ represents a weight balance Hyperparameter; $L_{SSIM} = (1-SSIM(I_t, \Gamma_t)/2)$; SSIM is an index for measuring a similarity between the restored image and the second image; $|\Gamma_t(u, v) - I_t(u, v)|$ represents a grayscale difference between the restored image and the second image.

In block S35, parameters of the depth estimation network are adjusted based on the loss of the depth estimation network.

In one embodiment, in the step S35, the photometric error and the gradient error are minimized for iterating and updating the parameters of the posture estimation sub-network and the depth estimation sub-network.

In one embodiment, the posture estimation sub-network outputs the pixel posture conversion relationship of each pixel, and the posture estimation sub-network learns and adjusts the pixel posture conversion relationship of each pixel. The inconsistent problem of the conversion RT and the camera RT of the moving object can be solved when the image includes the moving object. An accuracy of the posture conversion of the moving object is improved.

A computer readable storage medium is also provided in the present disclosure. The computer readable storage medium stores at least one instruction, which may be executed by the processor 20 to implement the above method for training the depth estimation network.

It will be evident to those skilled in the art that the invention is not limited to the details of the foregoing illustrative embodiments, and that the present invention may be embodied in other specific forms without departing from the spirit or essential attributes thereof. Thus, in any way, the embodiments should be regarded as exemplary, not limitative; the scope of the present invention is limited by the appended claims, instead of the above depiction. Thus, all variations intended to fall into the meaning and scope of equivalent elements of the claims should be covered within the present invention. No reference signs in the claims should be regarded as limiting the involved claims. Besides, it is apparent that the term "comprise" does not exclude other units or steps, and singularity does not exclude plurality. A plurality of units or means stated in the apparatus claims may also be implemented by a single unit or means through software or hardware. Terms such as the first and the second are used to indicate names, but do not indicate any particular sequence.

It should be emphasized that the above-described embodiments of the present invention, particularly, any preferred embodiments, are merely possible examples of implementations, merely set forth for a clear understanding of the principles of the invention. Many variations and modifications may be made to the above-described embodiment(s) of the invention without departing substantially from the spirit and principles of the invention.

What is claimed is:

1. A method for training a depth estimation network, applicable in an electronic device comprising a storage medium with computer programs and a processor; the processor executes the computer programs to implement the following instructions:
   acquiring a first image and a second image of a target object, the first image and the second image being images captured at different time points;
   inputting the first image into a depth estimation network and obtaining a depth image;
   inputting the first image and the second image into the depth estimation network, and obtaining a pixel posture conversion relationship between the first image and the second image, wherein the pixel posture conversion relationship comprises a position relationship between each first pixel in the first image and a corresponding second pixel in the second image; the first pixel and the second pixel correspond to a same part of the target object;
   generating a restored image based on the depth image, the pixel posture conversion relationship, and pre-obtained camera parameters;
   determining a loss of the depth estimation network based on a difference between the first image, the depth image, the restored image, and the second image; and
   adjusting parameters of the depth estimation network based on the loss of the depth estimation network;
   wherein the instructions of determining the loss of the depth estimation network based on the difference between the first image, the depth image, the restored image, and the second image comprises:
   calculating a photometric error between the first image and the restored image by a first loss function;
   calculating a gradient error between the first image and the depth image by a second loss function; and
   calculating the loss of the depth estimation network based on the photometric error and the gradient error.

2. The method of claim 1, wherein the depth estimation network comprises a posture estimation sub-network; the instructions of inputting the first image and the second image into the depth estimation network, and obtaining the pixel posture conversion relationship between the first image and the second image comprises:
   inputting the first image and the second image into the posture estimation sub-network and obtaining the pixel posture conversion relationship between the first image and the second image.

3. The method of claim 2, wherein the depth estimation network further comprises a depth estimation sub-network; the instructions of inputting the first image into the depth estimation network and obtaining the depth image comprises:

inputting the first image into the depth estimation sub-network and obtaining the depth image based on parameters of the depth estimation sub-network.

4. The method of claim 1, wherein the first loss function is as follows:

$$L_{somooth} = \Sigma_j |\nabla D_t(j)| e^{-|\nabla I_t(j)|}, \text{ for } j \in Sj$$

wherein $\nabla D_t(j)$ represents a gradient of a region of the target object in the first image $I_t$; $\nabla I_t(j)$ represents a gradient of a region of the target object in the depth image $D_t$; S represents a pixel point set of the target object in the first image $I_t$; and wherein the second loss function is as follows:

$$L_h(I_t, \Gamma_t) = (1+\alpha)|\Gamma_t(u,v) - I_t(u,v)| + \alpha L_{SSIM}$$

wherein $L_{ph}(I_t, \Gamma_t)$ represents a brightness uniformity error, $I_t$ represents the restored image; $\Gamma_t$ represents the second image; $\alpha$ represents a weight balance Hyperparameter; $L_{SSIM} = (1-SSIM(I_t, \Gamma_t)/2)$; SSIM is an index for measuring a similarity between the restored image and the second image; $|\Gamma_t(u,v) - I_t(u,v)|$ represents a grayscale difference between the restored image and the second image.

5. The method of claim 4, wherein the instruction of adjusting the parameters of the depth estimation network based on the loss of the depth estimation network comprises:
minimizing the photometric error and the gradient error for iterating and updating the parameters of the posture estimation sub-network and the depth estimation sub-network.

6. The method of claim 5, wherein the depth estimation sub-network is an autoencoder (AE) network; the AE network comprises an encoder and a decoder; the posture estimation sub-network is a convolutional neural network.

7. A training apparatus configured for a depth estimation network, the training apparatus comprises a storage medium and at least one processor; the storage medium stores at least one command; the at least one commands is implemented by the at least one processor to execute functions; the storage medium comprising:
an image acquiring module configured to acquire a first image and a second image of a target object, the first image and the second image being images captured at different time points;
a depth acquiring module configured to input the first image into a depth estimation network and obtain a depth image;
a posture acquiring module configured to input the first image and the second image into the depth estimation network and obtain a pixel posture conversion relationship between the first image and the second image, wherein the pixel posture conversion relationship comprises a position relationship between each first pixel in the first image and a corresponding second pixel in the second image; the first pixel and the second pixel correspond to a same part of the target object;
a generating module configured to generate a restored image based on the depth image, the pixel posture conversion relationship, and pre-obtained camera parameters;
a determining module configured to determine a loss of the depth estimation network based on a difference between the first image, the depth image, the restored image, and the second image; and
an adjusting module configured to adjust parameters of the depth estimation network based on the loss of the depth estimation network;
wherein the determining module further calculates a photometric error between the first image and the restored image by a first loss function; the determining module further calculates a gradient error between the first image and the depth image by a second loss function; the determining module further calculates the loss of the depth estimation network based on the photometric error and the gradient error.

8. An electronic device comprises:
a storage medium; and
a processor,
wherein the storage medium stores computer programs, and
the processor executes the computer programs to implement the following processes:
acquiring a first image and a second image of a target object, the first image and the second image being images captured at different time points;
inputting the first image into a depth estimation network and obtaining a depth image;
inputting the first image and the second image into the depth estimation network, and obtaining a pixel posture conversion relationship between the first image and the second image, wherein the pixel posture conversion relationship comprises a position relationship between each first pixel in the first image and a corresponding second pixel in the second image; the first pixel and the second pixel correspond to a same part of the target object;
generating a restored image based on the depth image, the pixel posture conversion relationship, and pre-obtained camera parameters;
determining a loss of the depth estimation network based on a difference between the first image, the depth image, the restored image, and the second image; and
adjusting parameters of the depth estimation network based on the loss of the depth estimation network;
wherein the instructions of determining the loss of the depth estimation network based on the difference between the first image, the depth image, the restored image, and the second image comprises:
calculating a photometric error between the first image and the restored image by a first loss function;
calculating a gradient error between the first image and the depth image by a second loss function; and
calculating the loss of the depth estimation network based on the photometric error and the gradient error.

9. The electronic device of claim 8, wherein the depth estimation network comprises a posture estimation sub-network; the instructions of inputting the first image and the second image into the depth estimation network, and obtaining the pixel posture conversion relationship between the first image and the second image comprises:
inputting the first image and the second image into the posture estimation sub-network and obtaining the pixel posture conversion relationship between the first image and the second image.

10. The electronic device of claim 9, wherein the depth estimation network further comprises a depth estimation sub-network; the instructions of inputting the first image into the depth estimation network and obtaining the depth image comprises:
inputting the first image into the depth estimation sub-network and obtaining the depth image based on parameters of the depth estimation sub-network.

11. The electronic device of claim 8, wherein the first loss function is as follows:

$$L_{smooth}=\Sigma_j|\nabla D_t(j)|e^{-|\nabla I_t(j)|}, \text{ for } j\in Sj$$

wherein $\nabla D_t(j)$ represents a gradient of a region of the target object in the first image $I_t$; $\nabla I_t(j)$ represents a gradient of a region of the target object in the depth image $D_t$; S represents a pixel point set of the target object in the first image $I_t$;

wherein the second loss function is as follows:

$$L_{ph}(I_t,\Gamma_t)=(1+\alpha)|\Gamma_t(u,v)-I_t(u,v)|+\alpha L_{SSIM}$$

wherein $L_{ph}(I_t,\Gamma_t)$ represents a brightness uniformity error, $I_t$ represents the restored image; $\Gamma_t$ represents the second image; α represents a weight balance Hyperparameter; $L_{SSIM}=(1-SSIM(I_t,\Gamma_t)/2)$; SSIM is an index for measuring a similarity between the restored image and the second image; $|\Gamma_t(u,v)-I_t(u,v)|$ represents a grayscale difference between the restored image and the second image.

12. The electronic device of claim 11, wherein the step of adjusting the parameters of the depth estimation network based on the loss of the depth estimation network comprises: minimizing the photometric error and the gradient error for iterating and updating the parameters of the posture estimation sub-network and the depth estimation sub-network.

13. The electronic device of claim 12, wherein the depth estimation sub-network is an autoencoder (AE) network; the AE comprises an encoder and a decoder; the posture estimation sub-network is a convolutional neural network.

14. The method of claim 1, wherein position coordinates of each pixel point in the restored image is calculated based on a position conversion algorithm, a formula of the position conversion algorithm is: $B_2=KTD_1K^{-1}B_1$; wherein B2 represents a position of a pixel point in the restored image; B1 represents a position of a pixel point in the first image, K represents a matrix composed by the pre-obtained camera parameters, T represents a pixel posture conversion relationship; a number of columns in K is equal to a number of rows in T.

* * * * *